United States Patent
Williamson et al.

(10) Patent No.: US 9,040,615 B2
(45) Date of Patent: May 26, 2015

(54) COMPOSITIONS OF POLYESTERS AND FIBROUS CLAYS

(75) Inventors: David T. Williamson, Chesterfield, VA (US); Thomas M. Herrod, Hendersonville, TN (US); William M. Simmons, Springfield, TN (US); Henry Max Schleinitz, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/296,205

(22) Filed: Nov. 14, 2011

(65) Prior Publication Data

US 2012/0292812 A1     Nov. 22, 2012

Related U.S. Application Data

(63) Continuation-in-part of application No. 12/418,344, filed on Apr. 3, 2009, now abandoned, which is a continuation of application No. 11/312,068, filed on Dec. 20, 2005, now abandoned.

(Continued)

(51) Int. Cl.
| | |
|---|---|
| C08K 9/04 | (2006.01) |
| B29C 71/00 | (2006.01) |
| C09D 167/02 | (2006.01) |
| C08K 3/34 | (2006.01) |
| C08L 67/02 | (2006.01) |
| C08K 3/00 | (2006.01) |

(Continued)

(52) U.S. Cl.
CPC ............ *C09D 167/02* (2013.01); *C08K 3/0033* (2013.01); *C08K 3/346* (2013.01); *C08K 5/0016* (2013.01); *C08L 63/00* (2013.01); *C08L 67/02* (2013.01)

(58) Field of Classification Search
USPC .......... 264/237, 572; 524/728, 590, 442, 445, 524/78, 242; 528/590, 272
See application file for complete search history.

(56) References Cited

U.S. PATENT DOCUMENTS

| | | |
|---|---|---|
| 3,749,697 A | 7/1973 | Barkey |
| 4,548,978 A | 10/1985 | Garrison, Jr. |
| RE32,334 E | 1/1987 | Deyrup |

(Continued)

FOREIGN PATENT DOCUMENTS

| | | |
|---|---|---|
| EP | 221225 A1 | 10/1985 |
| EP | 0170299 B1 | 1/1991 |

(Continued)

OTHER PUBLICATIONS

J.C. Matabayas, Jr. et al, "Nanocomposite Technology for Enhancing the Gas Barrier", in Polymer Clay Nanocomposites, T.J. Pinnavia, G.W. Beal eds., Wiley: New York, (2000) 218-226.

(Continued)

*Primary Examiner* — Joseph S Del Sole
*Assistant Examiner* — Nahida Sultana

(57) ABSTRACT

Compositions of thermoplastic polyesters containing dispersed nanoparticles of fibrous clay are made by polymerizing the polyester precursors in the presence of exfoliated fibrous clay that has not been organically modified. The compositions have good physical properties and can be melt molded into various articles. Many of these articles may be coated (painted) and are especially useful for appearance parts such as visible exterior automotive body parts.

11 Claims, 2 Drawing Sheets

Related U.S. Application Data

(60) Provisional application No. 60/638,225, filed on Dec. 22, 2004, provisional application No. 60/686,675, filed on Jun. 2, 2005, provisional application No. 60/686,728, filed on Jun. 2, 2005, provisional application No. 60/686,847, filed on Jun. 2, 2005, provisional application No. 60/686,689, filed on Jun. 2, 2005, provisional application No. 60/686,707, filed on Jun. 2, 2005, provisional application No. 60/686,708, filed on Jun. 2, 2005.

(51) Int. Cl.
*C08K 5/00* (2006.01)
*C08L 63/00* (2006.01)

(56) References Cited

U.S. PATENT DOCUMENTS

| | | | |
|---|---|---|---|
| 4,753,980 A | 6/1988 | Deyrup | |
| 5,039,783 A | 8/1991 | Brunelle et al. | |
| 5,231,161 A | 7/1993 | Brunelle et al. | |
| 5,407,984 A | 4/1995 | Brunelle et al. | |
| 5,633,018 A | 5/1997 | Stouffer et al. | |
| 5,668,186 A | 9/1997 | Brunelle et al. | |
| 5,698,624 A | 12/1997 | Beall et al. | |
| 6,084,019 A * | 7/2000 | Matayabas et al. | 524/445 |
| 6,458,879 B1 | 10/2002 | Grutke et al. | |
| 6,583,208 B1 * | 6/2003 | Suzuki | 524/445 |
| 7,138,453 B1 | 11/2006 | Suzuki et al. | |
| 7,476,707 B2 * | 1/2009 | Wu et al. | 524/847 |
| 8,357,743 B2 * | 1/2013 | Mahajan et al. | 524/417 |
| 8,383,713 B2 * | 2/2013 | Lubnin et al. | 524/425 |
| 2002/0010248 A1 * | 1/2002 | Fomperie et al. | 524/445 |
| 2004/0106720 A1 * | 6/2004 | Jerome et al. | 524/445 |
| 2004/0259999 A1 * | 12/2004 | Kim et al. | 524/445 |
| 2005/0032966 A1 * | 2/2005 | Meijer et al. | 524/495 |
| 2005/0137310 A1 * | 6/2005 | Gupta et al. | 524/445 |
| 2006/0141183 A1 * | 6/2006 | Williamson et al. | 428/35.2 |
| 2006/0205856 A1 * | 9/2006 | Williamson | 524/445 |
| 2007/0049680 A1 * | 3/2007 | Maruo et al. | 524/445 |
| 2007/0173585 A1 * | 7/2007 | Sevenich et al. | 524/445 |
| 2007/0173598 A1 * | 7/2007 | Williams et al. | 524/588 |
| 2007/0227748 A1 * | 10/2007 | Liggat et al. | 169/45 |
| 2008/0113189 A1 * | 5/2008 | Bhimaraj et al. | 428/339 |
| 2009/0281226 A1 * | 11/2009 | Mahajan | 524/446 |
| 2010/0331469 A1 * | 12/2010 | Mahajan et al. | 524/417 |
| 2012/0010360 A1 * | 1/2012 | Tsai et al. | 524/724 |
| 2014/0187413 A1 * | 7/2014 | Lagaron Cabello et al. | 502/62 |

FOREIGN PATENT DOCUMENTS

| | | |
|---|---|---|
| EP | 0454222 B1 | 4/1991 |
| JP | 2002-105902 | 10/2002 |
| JP | 83-62626 | 3/2008 |
| WO | WO 99/03914 A1 | 1/1999 |
| WO | WO99/48962 * | 3/1999 |
| WO | 02/068496 A1 | 9/2002 |
| WO | 03/093491 A1 | 11/2003 |

OTHER PUBLICATIONS

Bokobza et al., Polymer International 53 pp. 1060-1065 (2004).
C.E. Carraher, Jr., Seymour/Carraher's Polymer Chemistry, Book, 5$^{th}$ edition, Marcel Dekker Inc., NY, (2000), p. 60 and pp. 463-465.

* cited by examiner

COMPOSITIONS OF POLYESTERS AND FIBROUS CLAYS

CROSS REFERENCE TO RELATED APPLICATIONS

This application is a continuation-in-part of U.S. application Ser. No. 12/418,344 filed Apr. 3, 2009, which in turn is a continuation of U.S. application Ser. No. 11/312,068, filed Dec. 20, 2005, now abandoned which in turn claims the benefit of priority of U.S. Provisional Application No. 60/638,225, filed Dec. 22, 2004, U.S. Provisional Application No. 60/686,675, filed Jun. 2, 2005, U.S. Provisional Application No. 60/686,728, filed Jun. 2, 2005, U.S. Provisional Application No. 60/686,847, filed Jun. 2, 2005, U.S. Provisional Application No. 60/686,689, filed Jun. 2, 2005, U.S. Provisional Application No. 60/686,707, filed Jun. 2, 2005, U.S. Provisional Application No. 60/686,708, filed Jun. 2, 2005.

FIELD OF THE INVENTION

This invention concerns compositions comprising thermoplastic polyesters and fibrous clays, which are made by adding a fibrous clay to a polyester polymerization, and forming the compositions into useful parts.

TECHNICAL BACKGROUND OF THE INVENTION

Nanocomposites are compositions that can address many of the challenges currently presented by automotive plastics and composites needs. These materials offer a variety of desirable properties including: low coefficient of thermal expansion, high heat deflection temperatures, lightweight, improved scratch resistance, and good surface appearance. Nanocomposite compositions are polymers reinforced with nanometer sized particles, i.e., particles with a dimension on the order of 1 to several hundred nanometers. These materials can be used in structural, semi-structural, high heat underhood, and Class A automotive components, among others. In other words these nanocomposites are compositions in which small particles are dispersed in the plastic matrix.

Reinforced plastic materials are continually finding new uses in automotive components. These materials have certain advantages over metals which include higher impact loads before deformation, lighter weight, increased design flexibility, and corrosion resistance. Automotive structural applications have traditionally been made from continuous glass mat composites and highly filled plastic materials such as sheet molding compound ("SMC") where the polymeric component can be as little as 15% by weight. Both SMC and glass mat composite materials ("GMT"), however, are still relatively high in density.

Automobile trim and semi-structural components, on the other hand, are commonly fabricated from injection moldable thermoplastics and thermosets. These lighter weight composites, such as short fiber and mineral filled thermoplastics, could be substituted for metals or SMC and GMT composites in the same applications if their mechanical properties could meet the more stringent requirements. Virtually all bumper fascias and air intake manifolds have transitioned from metallic materials to plastics. As new plastic-based materials are developed, the transition will also encompass both more structural components, as well as Class A body panels and high heat under hood applications.

Injection moldable thermoplastics have long been mechanically reinforced by the addition of particulate and fiber fillers in order to improve mechanical properties such as stiffness, dimensional stability, and temperature resistance. Typical fillers include chopped glass fiber and talc, which are added at filler loadings of 20-40% in order to obtain significant mechanical reinforcement. At these loading levels, however, low temperature impact performance and material toughness are usually sacrificed. Polymer-silicate nanocomposite materials, in other words compositions in which the silicate is dispersed as very small particles, can address these issues.

Polymer-layered silicate nanocomposites normally incorporate a layered clay mineral filler in a polymer matrix. Layered silicates are made up of several hundred thin platelet layers stacked into an orderly packet known as a tactoid. Each of these platelets is characterized by large aspect ratio (diameter/thickness on the order of 100-1000). Accordingly, when the clay is dispersed homogeneously and exfoliated as individual platelets throughout the polymer matrix, dramatic increases in strength, flexural and Young's modulus, and heat distortion temperature are observed at very low filler loadings (<10% by weight) because of the large surface area contact between polymer and filler.

In some cases, it is necessary to include both platelet-type nanoparticles and other fillers to achieve desired characteristics. For example, U.S. Pat. No. 7,138,453 discloses dispersing platelet-type nanoparticles in a thermoplastic polyester and then melt kneading the resulting nanocomposite with reinforcing fibrous fillers, e.g., glass fiber, carbon fiber, aramid fiber, silicon carbide fiber, alumina fiber and boron fiber, whiskers such as silicon carbide whisker, silicon nitride whicker, magnesium oxide whisker, potassium titanate whisker and alunimo borate whisker, and needle crystals such as wollastonite, zonotolite, PMF, plaster fiber, dawsonite, MOS, phosphate fiber and sepiolite. For both processing capability and reinforcing efficacy, the reinforcing fibers are 2 to 20 micrometers in diameter (U.S. Pat. No. 7,138,453, col. 5, line 45 through col. 6, line 7; Examples 18 through 24).

Attempts to generate nanocomposites, or compositions containing nanosized particles dispersed in a thermoplastic polyester matrix, have been only marginally successful. It is desirable to disperse and exfoliate clays in polyesters both for automotive applications and to enhance barrier properties, for example, in packaging applications.

One route to preparing nanocomposite compositions is exfoliation through polymerization. This approach typically involves dispersing the nanofiller, usually a smectite like a montmorillonite, in one or more of the monomers and subsequently forming the polymer around the dispersion. One of the keys to successfully exfoliating the clay with this process involves selecting the proper intercalating agent. The interaction between the intercalating agent and the monomer must be sufficiently strong so that it is capable of driving the monomer into the galleries of the clay. Therefore, this process requires the use of an intercalating agent and as such introduces the same thermal stability issues described above.

Current literature typically teaches against the use of in situ polymerization approach for the preparation of clay nanocomposite compositions. For example, Matayabas et al. found that polymers prepared with organically modified clays did not exhibit any increase in the basal spacing of the clays after polymerization and no new basal spacings occurred during the polymerization. After transesterification, no individual platelets were identified. The formation of the individual platelets occurred during the polycondensation step of the polymerization process (J. C. Matabayas, Jr. et al, "Nanocomposite Technology For Enhancing The Gas Barrier," in *Polymer Clay Nanocomposites*, T. J. Pinnavia, G. W. Beall eds., Wiley: New York, (2000) 218-222).

Another route employed in the preparation of polyester-based nanocomposite compositions is the use of another polymer such as poly(vinyl pyrrolidone) to facilitate the exfoliation of the clay into the polymer matrix. Nanocor® Inc. (Nanocor® Inc. is a wholly owned subsidiary of AMCOL International Corporation, Arlington Heights, Ill.) and Eastman Chemical Company (Kingsport, Tenn.) have both employed this approach in the preparation of polyester-based nanocomposites for use in applications that require materials with excellent barrier properties and mechanical properties (see, e.g., U.S. Pat. No. 5,698,624 to Nanocor® and PCT Int. Appl. WO 99/03914 to Eastman Chemical). However, this approach typically uses a solution based process that allows the clay and polymer to interact and increase the basal spacing on the clays. The solvent is subsequently removed under vacuum yielding an intercalated smectic clay system. The materials are then melt compounded with the desired polymer matrix (typically PET), extruded, and pelletized. This approach suffers from the requirement to use a large amount of solvent. For example, the polymer and clay represent only a small weight percent of the intercalation solution. (Trexler Jr., J. W., Piner, R. L., Turner, S. R. and Barbee, R. B. PCT Int. Appl. WO 99/03914). Furthermore, the introduction of a polymer (e.g., poly(vinyl pyrrolidone)) at the interface between the polyester and the clay filler alters the interaction between the polyester matrix and the nanoclay filler particles.

Another process for making thermoplastic polyester nanocomposites, using untreated "layered phyllosilicate" (i.e., platelet nanoclays), is disclosed in U.S. Pat. No. 7,138,453, comprising preparing a dispersion containing layered phyllosilicate and water, adding the dispersion continuously or successively to a component having low polymerization degree of the thermoplastic polyester resin at a rate of 0.01 to 10.0 parts by weight per minute based on 100 parts by weight of the component having low polymerization degree of the thermoplastic polyester resin; and polymerizing the thermoplastic polyester.

Thermoplastic polyester compositions in general are important items of commerce, being used for fibers, molded and extruded parts, foams, and other uses. Many of these polyesters are semicrystalline, such that part of the polyester is in a crystalline form in the end use part. In semicrystalline polymers in general, part of the polymer is present in an amorphous (glassy) form, and part of the polymer is present as crystallites, usually distributed throughout the polymer. In most instances, it is preferred that polyesters which can crystallize be used in the semicrystalline form, and often it is helpful or necessary that the polyester crystallize relatively rapidly for the purpose of forming the final part.

For example, in injection molding of thermoplastics, the molten polymer is injected into a mold and rapidly cooled until it is solid. The mold is then opened and solid part is ejected from the mold. If the part is not solid and/or deforms easily upon ejection from the mold, it may be deformed and thereby rendered useless. An important facet in obtaining a relatively strong part from semicrystalline polyesters is that they be (at least partially) crystallized when they are removed from the mold. However, some semicrystalline polyesters crystallize very slowly, so they would have to be in the mold a long time to allow them to be demolded without significant deformation. This would lead to long molding cycles, which is economically highly undesirable.

To solve this problem, so-called "crystallization packages" or "crystallization initiator systems" have been developed for slow crystallizing polyesters. These packages provide much faster crystallization initiation and/or a higher crystallization rate and/or a lower crystallization temperature. For example poly(ethylene terephthalate) (PET) is a slow crystallizing polyester, and by itself is usually unsuitable for injection molding because of the very long molding cycles and/or high mold temperatures needed. However crystallization packages have been developed for this polyester, making it suitable for injection molding and other forming processes. A typical crystallization package for PET is a sodium ion source such as a sodium or a sodium salt of a carboxylate containing polymer and a small amount of plasticizer for the PET; see for instance U.S. Pat. RE32,334. While not all polyesters are slow crystallizing, faster crystallization may lead to shorter melt processing cycle times which are more desirable.

For the reasons set forth above, there exists a need for an improved process for dispersing and exfoliating filler material in a polyester matrix.

SUMMARY OF THE INVENTION

This invention concerns a process for manufacturing a thermoplastic polyester nanocomposite composition, comprising mixing exfoliated fibrous clay with at least one thermoplastic polyester precursor composition wherein the components of the precursor composition are selected from the group consisting of a. at least one diacid or diester and at least one diol;
b. at least one polymerizable polyester monomer;
c. at least one linear polyester oligomer; and
d. at least one macrocyclic polyester oligomer, and, optionally, a polymerization catalyst in addition to the exfoliated fibrous clay, and subsequently polymerizing said at least one polyester precursor in the presence or absence of a solvent, wherein said exfoliated fibrous clay has not been organically modified prior to mixing.

Also described herein is the product of this process, methods for forming articles of manufacture such as shaped parts, and methods of coating (painting) such articles, as well as uses for some of these.

DETAILED DESCRIPTION OF THE INVENTION

Figure 1:
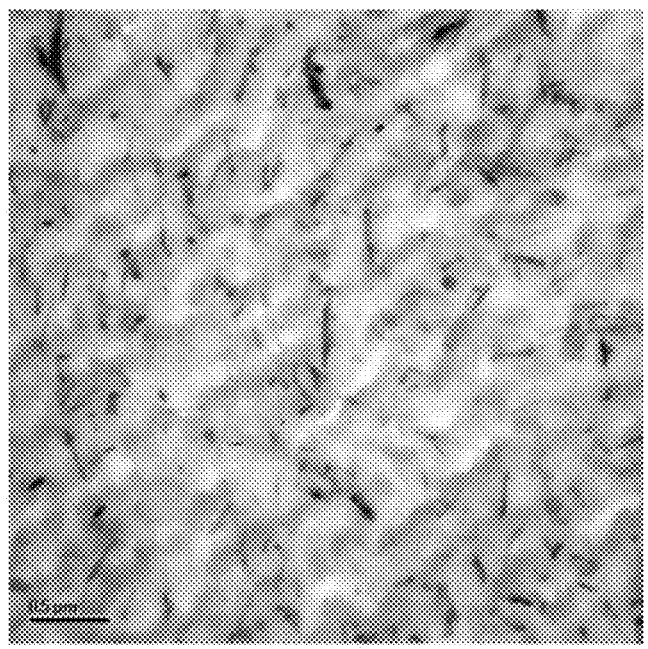
FIG. 1 is a transmission electron micrograph of PET containing 3 wt % sepiolite (Pangel® S9).

In the context of this disclosure, a number of terms shall be utilized.

As used herein, "polyester precursor" means material which can be polymerized to a polyester, such as diacid (or diester)/diol mixtures, polymerizable polyester monomers, and polyester oligomers.

As used herein, "polymerizable polyester monomer" means a monomeric compound which polymerizes to a polyester either by itself or with other monomers (which are also present). Some examples of such compounds are hydroxyacids, such as the hydroxybenzoic acids and hydroxynaphthoic acids, and bis(2-hydroxyethyl)terephthalate, and compounds which are bis(hydroxylalkyl)esters of dicarboxylic acids.

As used herein, "oligomer" means a molecule that contains 2 or more identifiable structural repeat units of the same or different formula.

As used herein, "linear polyester oligomer" means oligomeric material, excluding macrocyclic polyester oligomers (vide infra), which by itself or in the presence of monomers can polymerize to a higher molecular weight polyester. Linear polyester oligomers include, for example, oligomers of linear polyesters and oligomers of polymerizable polyester monomers. For example, reaction of dimethyl terephthalate or terephthalic acid with ethylene glycol, when carried out to remove methyl ester or carboxylic groups, usually yields a mixture of bis(2-hydroxyethyl)terephthalate and a variety of oligomers: oligomers of bis(2-hydroxyethyl)terephthalate, oligomers of mono(2-hydroxyethyl)terephthalate (which contain carboxyl groups), and polyester oligomers capable of being further extended. Preferably, in the practice of the present invention, such oligomers will have an average degree of polymerization (average number of monomer units) of about 20 or less, more preferably about 10 or less.

As used herein, a "macrocyclic" molecule means a cyclic molecule having at least one ring within its molecular structure that contains 8 or more atoms covalently connected to form the ring.

As used herein, "macrocyclic polyester oligomer" means a macrocyclic oligomer containing 2 or more identifiable ester functional repeat units of the same or different formula. A macrocyclic polyester oligomer typically refers to multiple molecules of one specific formula having varying ring sizes. However, a macrocyclic polyester oligomer may also include multiple molecules of different formulae having varying numbers of the same or different structural repeat units. A macrocyclic polyester oligomer may be a co-oligoester or multi-oligoester, i.e., a polyester oligomer having two or more different structural repeat units having an ester functionality within one cyclic molecule.

As used herein a "polyester" means a thermoplastic polymer in which more than 50% of the linking groups are ester groups. Other linking groups, such as amide or/and imide may also be present.

As used herein, the term "nanocomposite" or "polymer nanocomposite" or "nanocomposite composition" means a polymeric material which contains particles, dispersed throughout the polymeric material, having at least one dimension in the 0.1 to 100 nm range ("nanoparticles"). The polymeric material in which the nanoparticles are dispersed is often referred to as the "polymer matrix." The term "polyester composite" refers to a nanocomposite in which the polymeric material includes at least one polyester.

As used herein, the term "fibrous clay" refers to sepiolite clay, attapulgite (palygorskite) clay, and their mixtures.

The term "exfoliate" literally refers to casting off in scales, laminae, or splinters, or to spread or extend by or as if by opening out leaves. In the case of smectic clays, "exfoliation" refers to the separation of platelets from the smectic clay and subsequent dispersion of these platelets throughout the polymer matrix. As used herein, for fibrous clays, "exfoliation" or "exfoliated" means the separation of fiber bundles or aggregates into fibrous nanoparticles. These exfoliated fibrous clay nanoparticles, also referred to more concisely herein as "fibrous clay nanoparticles" or, for specific exfoliated fibrous clays, "sepiolite nanoparticles" or "attapulgite nanoparticles," are then dispersed throughout the polymer matrix.

As used herein, the term "organic" denotes carbon-containing compounds with the following exceptions: binary compounds as the carbon oxides, carbides, carbon disulfide, etc.; ternary compounds such as metallic cyanides, metallic carbonyls, phosgene, carbonylsulfide; and metallic carbonates such as calcium carbonate and sodium carbonate.

As used herein, term "organically modified" describes a clay that has been contacted with an organic compound to change the clay's surface properties or interlayer distance. A clay can be treated with an organic compound, a "hydrophobicizer," to make the clay surface more compatible with systems of low-to-medium polarity; an example is treatment with a quaternary ammonium salt such as dimethylbenxylalkylammonium chloride, as disclosed in European Patent Application 221,225. Further, in forming a polymer nanocomposite with a smectic clay like montmorillonite, an ionic hydrophobicizer can replace metal cations between the constituent layers of the clay ("intercalation"), pushing the layers farther apart ("delamination"). Clay having a high cation exchange capacity (e.g., at least 50 meq/100 g) is thus preferred for this approach to be effective. Subsequent processing is then needed to fully exfoliate the clay. Typically, hydrophobicizers are organic compounds derived from oxonium, ammonium, phosphonium or sulfonium ions, which may carry one or more organic radicals. Quaternary ammonium salts are commonly used. Many other hydrophobicizers are listed in U.S. Pat. No. 6,458,879 (col. 3, l. 63-col. 5, l. 30).

As used herein, "an alkylene group" means —$C_nH_{2n}$— where $n \geq 1$.

As used herein, "a cycloalkylene group" means a cyclic alkylene group, —$C_nH_{2n-x}$—, where x represents the number of H's replaced by cyclization(s).

As used herein, "a mono- or polyoxyalkylene group" means [—$(CH_2)_y$—O—$]_n$—$(CH_2)_y$—, wherein y is an integer greater than 1 and n is an integer.

As used herein, "an alicyclic group" means a divalent non-aromatic hydrocarbon group containing a cyclic structure therein.

As used herein, "a divalent aromatic group" means an aromatic group with links to other parts of the macrocyclic molecule. For example, a divalent aromatic group may include a meta- or para-linked monocyclic aromatic group. Preferably the free valencies are to aromatic ring carbon atoms.

By a "dicarboxylic acid" in the context of a polymerization process herein is meant the dicarboxylic acid itself or any simple derivative such as a diester which may be used in such a polymerization process. Similarly by a "diol" is meant a diol or any simple derivative thereof which can be used in a polymerization process to form a polyester.

As used herein, "a solid particulate filler exclusive of the fibrous clay" means any solid (infusible at temperatures to which the composition is normally exposed) which is finely divided enough to be dispersed under melt mixing conditions (see below) into the composition.

As used herein, "(meth)acrylate" means the compound may be either an acrylate, a methacrylate, or a mixture of the two.

Where a range of numerical values is recited herein, unless otherwise stated, the range is intended to include the endpoints thereof, and all integers and fractions within the range. It is not intended that the scope of the invention be limited to the specific values recited when defining a range.

Fibrous Clay

Sepiolite [$Mg_4Si_6O_{15}(OH)_2 \cdot 6(H_2O)$] is a hydrated magnesium silicate filler that exhibits a high aspect ratio due to its fibrous structure. Unique among the silicates, sepiolite is composed of long lath-like crystallites in which the silica chains run parallel to the axis of the fiber. The material has been shown to consist of two forms, an α and a β form. The α form is known to be long bundles of fibers and the β form is present as is amorphous aggregates.

Attapulgite (also known as palygorskite) is almost structurally and chemically identical to sepiolite except that attapulgite has a slightly smaller unit cell. As used herein, the term "fibrous clay(s)" includes attapulgite clay, sepiolite clay and mixtures thereof.

Figure 2:
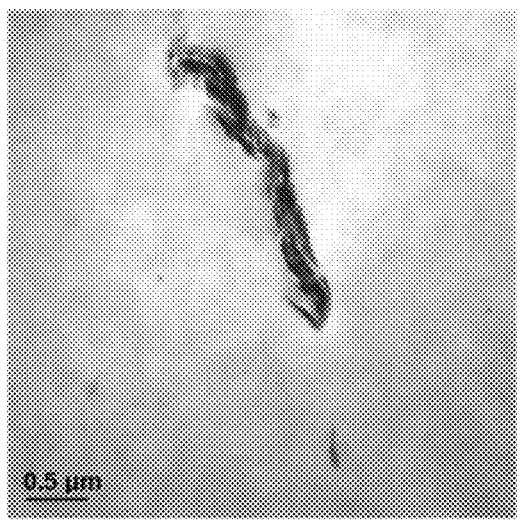
FIG. 2 is a transmission electron micrograph of PET containing 2.5 wt % Sodium Cloisite® 25A.

Fibrous clays are layered fibrous materials in which each layer is made up of two sheets of tetrahedral silica units bonded to a central sheet of octahedral units containing magnesium ions (see, e.g., FIGS. 1 and 2 in L. Bokobza et al., Polymer International, 53, 1060-1065 (2004)). The fibers stick together to form fiber bundles, which in turn can form agglomerates. These agglomerates can be broken apart by industrial processes such as micronization or chemical modification (see, e.g., European Patent 170,299 to Tolsa, S. A.) to produce nanometer diameter fibers, i.e., exfoliated fibrous clay nanoparticles.

The fibrous clay used in the process described herein not been organically modified, i.e., the surface of the fibrous clay has not been contacted with an organic compound ("hydrophobicizer") such as derived from oxonium, ammonium, phosphonium or sulfonium ions, which may carry one or more organic radicals. Such compounds tend to degrade at the temperatures used to process polyesters such as PET and PBT.

In an embodiment, the fibrous clay is rheological grade, such as described in European patent applications EP-A-0454222 and EP-A-0170299 and marketed under the trademark Pangel® by Tolsa, S. A., Madrid, Spain. As described therein, "rheological grade" denotes a fibrous clay with a specific surface area greater than 120 m$^2$/g (N$_2$, BET), and typical fiber dimensions: 200 to 2000 nm long, 10-30 nm wide, and 5-10 nm thick. Rheological grade sepiolite is obtained from natural sepiolite by means of special micronization processes that leads essentially to a disagglomeration of the fiber bundles while at the same time substantially preventing breakage of the exfoliated sepiolite fibers Additionally, rheological grade sepiolite has a very low cationic exchange capacity (10-20 meq/100 g) and the interaction with electrolytes is very weak, which in turn causes rheological grade sepiolite not to be practically affected by the presence of salts in the medium in which it is found, and therefore, it remains stable in a broad pH range. The low cation exchange capacity also makes it less suitable for the cation exchange/intercalation/delamination treatment used for smectic clays having higher cation exchange capacity, like montmorillonite, which typically has a cation exchange capacity of about 100 meq/100 g.

The above-mentioned qualities of rheological grade sepiolite can also be attributed to rheological grade attapulgite, such as for example the range of ATTAGEL goods (for example ATTAGEL 40 and ATTAGEL 50) manufactured and marketed by the firm Engelhard Corporation, United States, and the MIN-U-GEL range of Floridin Company.

The amount of fibrous clay used in the present invention ranges from about 0.1 to about 35 wt % based on the final composite composition, more preferably based on the total amount of fibrous clay and polyester in the composition. The specific amount chosen will depend on the intended use of the nanocomposite composition, as is well understood in the art. For example, in film, it may be advantageous to use as little fibrous clay as possible, so as to retain desired optical properties. "Masterbatches" of the nanocomposite composition containing relatively high concentrations of exfoliated clay may also be made and used. For example a nanocomposite composition masterbatch containing 30% by weight of the exfoliated clay may be used. If a composition having 3 weight percent of the exfoliated clay is needed, the composition containing the 3 weight percent may be made by melt mixing 1 part by weight of the 30% masterbatch with 9 parts by weight of the "pure" polyester. During this melt mixing other desired components can also be added to form the final desired composition.

Preferably the clay is in the form of a fine particulate, so it may be readily dispersed in the liquids of the polyester polymerization process.

Polyesters

Polyesters most suitable for use in practicing the invention comprise thermoplastic polyester homopolymers and copolymers (both block and random), and random copolymers are preferred.

The production of polyesters from diols and hydrocarbyl diacids or esters of such diacids, as well as hydroxyacids by themselves or in combination with diols and diacids is well known in the art, as described by A. J. East, et al. in the *Kirk-Othmer Encyclopedia of Chemical Technology*, John Wiley & Sons, J. I. Kroschwitz exec. ed., 4$^{th}$ edition (1996), vol. 19, 609-653. In the first stage, esterification or ester interchange between the diacid or its dialkyl (typically dimethyl) ester and the diol takes place to give the bis(hydroxyalkyl)ester and some oligomers along with the evolution and removal of water or alcohol (typically methanol).

Because the esterification or ester-interchange is an inherently slow reaction, catalysts are commonly used. Examples of useful esterification or ester-interchange catalysts are calcium, zinc, and manganese acetates; tin compounds; and titanium alkoxides. In the second stage, polycondensation, the bis(hydroxyalkyl)ester and oligomers continue to undergo ester-interchange reactions, eliminating diol, which is removed under high vacuum, and building molecular weight. Examples of useful polycondensation catalysts include tin, titanium, antimony, and germanium compounds, particularly antimony oxide (Sb$_2$O$_3$) which is commonly used in the case of poly(ethylene terephthalate) (PET). However it has been found that the fibrous clays are also catalysts for this type of polymerization to form polyesters. Therefore "added" catalysts such as those described above may be reduced in amount or even totally eliminated (none added except of course the clay) when making the nanocomposite compositions.

In the case that the production of DEG (as a byproduct from ethylene glycol during a polymerization) needs to be controlled during the reaction, a range of catalysts can be used. These include the use of lithium acetate buffers as described in U.S. Pat. No. 3,749,697 and a range of sodium and potassium acetate buffers as described in JP 83-62626, RO 88-135207, and JP 2001-105902. Typically, 100-600 ppm of sodium or potassium acetate was used during the polymerization to minimize the degree of DEG formation and incorporation into the polymer.

Among suitable diacids (and their corresponding esters) are those selected from the group consisting of terephthalic acid, isophthalic acid, naphthalene dicarboxylic acids, cyclohexane dicarboxylic acids, succinic acid, glutaric acid, adipic acid, sebacic acid, 1,12-dodecanedioic acid and the derivatives thereof, such as, for example, the dimethyl, diethyl, or dipropyl esters.

Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,2-cyclohexane dimethanol, 1,3-cyclohexane dimethanol, 1,4-cyclohexane dimethanol, 2,2,4,4-tetramethyl-1,3-cyclobutane diol, isosorbide, naphthalene glycols, diethylene glycol, triethylene glycol, resorcinol, hydroquinone, and longer chain diols and polyols which are the reaction products of diols or polyols with alkylene oxides.

In one preferred type of polyester the dicarboxylic acids comprise one or more of terephthalic acid, isophthalic acid and 2,6-naphthalene dicarboxylic acid, and the diol component comprises one or more of $HO(CH_2)_nOH$ (I), 1,4-cyclohexanedimethanol, $HO(CH_2CH_2O)_mCH_2CH_2OH$ (II), and $HO(CH_2CH_2CH_2CH_2O)_zCH_2CH_2CH_2CH_2OH$ (III), wherein n is an integer of 2 to 10, m on average is 1 to 4, and is z an average of about 7 to about 40. Note that (II) and (III) may be a mixture of compounds in which m and z, respectively, may vary and hence since m and z are averages, they do not have to be integers. In preferred polyesters, n is 2, 3 or 4, and/or m is 1.

Polyesters can also be produced directly from polymerizable polyester monomers. Some representative examples of suitable polymerizable polyester monomers for use in the present invention include hydroxyacids such as hydroxybenzoic acids and hydroxynaphthoic acids, bis(2-hydroxyethyl)terephthalate, bis(4-hydroxybutyl)terephthalate, bis(2-hydroxyethyl)naphthalenedioate, bis(2-hydroxyethyl)isophthalate, bis[2-(2-hydroxyethoxy)ethyl]terephthalate, bis[2-(2-hydroxyethoxy)ethyl]isophthalate, bis[(4-hydroxymethylcyclohexyl)methyl]terephthalate, and bis[(4-hydroxymethylcyclohexyl)methyl]isophthalate, mono(2-hydroxyethyl)terephthalate, and bis(2-hydroxyethyl) sulfoisophthalate.

Polyesters can also be produced directly from macrocyclic polyester oligomers. Macrocyclic polyester oligomers that may be employed in this invention include, but are not limited to, macrocyclic poly(alkylene dicarboxylate) oligomers having a structural repeat unit of the formula:

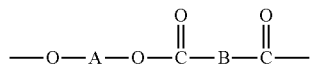

wherein A is an alkylene group containing at least two carbon atoms, a cycloalkylene, or a mono- or polyoxyalkylene group; and B is a divalent aromatic or alicyclic group. They may be prepared in a variety of ways, such as those described in U.S. Pat. Nos. 5,039,783, 5,231,161, 5,407,984, 5,668,186, U.S. Provisional Patent Application No. 60/626,187, PCT Patent Applications WO 2003093491 and WO 2002068496, and A. Lavalette, et al., Biomacromolecules, vol. 3, p. 225-228 (2002). Macrocyclic polyester oligomers can also be obtained through extraction from low-molecular weight linear polyester.

Preferred macrocyclic polyester oligomers are macrocyclic polyester oligomers of 1,4-butylene terephthalate (CBT); 1,3-propylene terephthalate (CPT); 1,4-cyclohexylenedimethylene terephthalate (CCT); ethylene terephthalate (CET); 1,2-ethylene 2,6-naphthalenedicarboxylate (CEN); the cyclic ester dimer of terephthalic acid and diethylene glycol (CPEOT); and macrocyclic cooligoesters comprising two or more of the above structural repeat units.

Specific preferred polyesters include poly(ethylene terephthalate) (PET), poly(1,3-propylene terephthalate) (PPT), poly(1,4-butylene terephthalate) (PBT), a thermoplastic elastomeric polyester having poly(1,4-butylene terephthalate) and poly(tetramethylene ether)glycol blocks (available as Hytrel® from E. I. du Pont de Nemours & Co., Inc., Wilmington, Del. 19898 USA), and poly(1,4-cylohexyldimethylene terephthalate) (PCT), and PET, is especially preferred. If more than one polyester (with the proper melting points) is present, the total of such polymers in the composition is taken as component (a).

The polyesters in the nanocomposite compositions of the present invention may be branched or unbranched, and may be homopolymers or copolymers.

Particularly notable are "modified polyesters" (or more precisely copolymers) which are defined as being modified with up to 10% by weight of a comonomer. Unless indicated otherwise, by the term polyester polymer (or oligomer) is meant modified and unmodified polyester polymers (or oligomers). Similarly, by the mention of a particular polyester, for example, poly(ethylene terephthalate) (PET), is meant unmodified or modified PET. Comonomers can include diethylene glycol (DEG), triethylene glycol, 1,4-cyclohexane dimethanol, isosorbide, isophthalic acid (IPA), 2,6-naphthalene dicarboxylic acid, adipic acid and mixtures thereof. Typically preferred comonomers for PET include 0-5% by weight IPA and 0-3% by weight DEG.

The polyester used may be any polyester with the requisite (when required) melting point. Preferably the melting point of the polyester is about 100° C. or higher, and more preferably about 150° C. or higher, and especially preferably about 200° C. or higher. Amorphous polyesters, that is polyesters with melting point (if any) below about 25° C. may also be used in this process to form polyester nanocomposite compositions, and the resulting polyester nanocomposite compositions and items may be made from these compositions. These amorphous polyesters may have glass transition temperatures above room temperature above which they need to be heated to be melt formed.

Polyesters (which have mostly or all ester linking groups) are normally derived from one or more dicarboxylic acids and one or more diols. They can also be produced from polymerizable polyester monomers or from macrocyclic polyester oligomers. Also preferably the polyester at least about 90% of the linking groups are ester groups, and more preferably essentially all of the linking groups are ester groups.

Polyester Composition Synthesis Conditions

Process conditions for making the polyester composition (nanocomposite) material are the same as those known in the art for manufacturing polyesters in a melt or solution process. The fibrous clay can be added by any means known in the art at any convenient stage of manufacture before the polyester average degree of polymerization is about 20. For example, it can be added at the beginning with the monomers, during monomer esterification or ester-interchange, at the end of monomer esterification or ester-interchange, or early in the polycondensation step.

The polymerization process may be done in any way known in the art. For example it may be a batch, semibatch or continuous process. Both these types of processes are will known in the art, see A. J. East, et al., cited above. For commercial use a continuous process is preferred. Another process variation is melt polymerization of the polyester precursors to a polyester whose molecular weight is suitable for so-called solid state polymerization, and then subjecting this polyester to solid state polymerization to achieve the desired molecular weight.

In other preferred process embodiments, especially continuous processes, the fibrous clay can be added to the polyester manufacturing process at any point starting with the monomer reactor (where the diacid and the diol are reacted to from the polyester monomer) up to but not including the 'finisher' (the vessels where the final molecular weight is achieved). In one embodiment, the fibrous clay can be added as a dry powder directly into the process into the molten monomer, oligomer or prepolymer. This includes direct introduction to the process as a stand alone material or in combination with another dry powder such as terephthalic acid or isophthalic acid. In another embodiment the fibrous clay can be added to a side stream of the molten process monomer, oligomer or prepolymer where it is mixed with this side stream and the combined stream is reinjected into the process. In another embodiment, the fibrous clay can be slurried or made into a paste using one of the ambient temperature liquid ingredients of the polyester manufacturing process and the resulting slurry or paste can be injected into the process. The ambient temperature liquid ingredients include ethylene glycol, 1,4-butanediol, and 1,3-propanediol, 1,4-cyclohexanedimethanol. In another embodiment, fibrous clay can be mixed with molten ingredients, such as dimethyl terephthalate, and added to process.

Where it is desired to add the fibrous clay as a slurry with one of the ambient temperature liquid ingredients, the slurry can be prepared by mixing 0.1% to 20% fibrous clay with 80% to 99.9% liquid ingredient by weight. High slurry viscosity makes it difficult to pump, meter, or otherwise transport the slurry. Increasing slurry temperature and more aggressive mixing are known to increase slurry viscosity. Slurry viscosity can be minimized by 1) mixing the fibrous clay with the liquid ingredient at as low a temperature as is practical, 2) maintaining the temperature of the slurry as low as is practical, and 3) mixing the fibrous clay powder into the liquid with only enough energy and/or shear to wet the powder, and 4) avoiding prolonged mixing once a stable slurry as been formed. In one embodiment 4% to 7% fibrous clay and 93% to 95% liquid ingredient are mixed. In another embodiment 7% to 9% fibrous clay by weight and 91% to 93% by weight liquid ingredient are mixed. In another embodiment 9% to 12% fibrous clay and 88% to 91% liquid ingredient by weight are mixed. In another embodiment 12% to 16% fibrous clay and 84% to 88% liquid ingredient by weight are mixed. In any type of process, one preferred way of carrying out the process the fibrous clay is added to one or more of the polyester precursors, especially to a liquid diol (glycol), if a diol is used in the polymerization. It is preferred to mix the liquid diol and clay so that the clay particles are wetted by the diol. The slurry formed may them be added to the polymerization process. In an especially preferred process a slurry containing the diol is added to the other process ingredients after 75 percent of the byproduct water or alcohol (from the condensation of a dicarboxylic acid or diester with a glycol) has been removed from the polymerization process. Optionally also present in the diol when the clay is added and/or mixed may be other monomers such as dicarboxylic acids or their esters, and hydroxycarboxylic acids. If a diol is not used the clay may be mixed with any other liquid monomer or polyester precursor. Again it is preferred that the clay is wetted by the polyester precursor(s). The wetting of the clay may be carried out by merely mixing the slurry of liquid polyester precursor(s) and clay, and optionally other solid polyester precursors. Other more intensive mixing methods may also be used, such as using a "homogenizer" or a paint mill. Also any other additional fillers may be present (added) at this time.

Other materials may also optionally be present during the polymerization process, such as stabilizers, antioxidants, and other materials sometimes added to such processes. Other filler(s) and/or reinforcing agent(s) may also be present in the polymerization, either from the beginning of the process or added during the process as long as they do not interfere with the polymerization (for example, increase or decrease the rate, limit the achievable molecular weight, affect formation of byproducts, etc.). If the composition is meant for eventual use in appearance parts these solids should preferably meet the particle size specifications outlined herein. However they need not meet these specifications if the composition is not meant to be used for appearance parts.

Articles comprising the nanocomposite compositions produced by the present invention may be prepared by any means known in the art, such as, but not limited to, methods of injection molding, extrusion, blow molding, thermoforming, solution casting, or film blowing.

The nanocomposite composition is heated to a temperature above a melting point (or glass transition temperature if it is amorphous) of the polyester; optionally melt-mixed with additional ingredients as described below, formed into the desired shape (typically, droplets or a strand), and cooled from a temperature above a melting point of said polyester to a temperature below said melting point. Particle formation can be carried out through a number of processes such as prilling, pastillization and strand cutting, as is known in the art. The particle formation and crystallization processes can be carried out as separate steps or as a single step. This single step process can be done, for example, by using a heated turntable or using a Rotoformer® pastillator with a heated belt, as disclosed in U.S. Pat. No. 5,633,018. In this technology, a melt is formed into particles (corresponding to step (c) above) which are held at an appropriate, cooler temperature for crystallization (corresponding to step (d) above), thus combining crystallization and particle formation into a single step. Crystallization occurs at a temperature below the melting temperature and above the $T_g$ of the mixture, generally close to the temperature of maximum crystallization rate. As demonstrated below (Example 2, Comparative Example D), the organically unmodified fibrous clay is much more effective at increasing crystallization rate than the montmorillonite clay, which is not fibrous.

Ingredients to be Melt-Mixed with the Nanocomposite Composition

Solid Particulate Fillers Exclusive of the Fibrous Clay

Such fillers must be finely divided enough to be dispersed under melt mixing conditions (see below) into the composition. Typically, the solid particulate filler will be a material which may already be used in thermoplastic compositions, such as pigments, reinforcing agents, and fillers. The solid particulate filler may or may not have a coating on it, for example, a sizing and/or a coating to improve adhesion of the solid particulate filler to the polymers of the composition. The solid particulate filler may be organic or inorganic. Useful solid particulate fillers include minerals such as clay (other than sepiolite and attapulgite), talc, wollastonite, mica, and calcium carbonate; glass in various forms such as fibers, milled glass, solid or hollow spheres; carbon as black or fiber; titanium dioxide; aramid in the form of short fibers, fibrils or fibrids; and flame retardants such as antimony oxide, sodium antimonate, and appropriate infusible organic compounds. Preferred solid particulate filler are wollastonite, mica, talc, glass especially glass fiber, and calcium carbonate.

The solid particulate material may be conventionally melt mixed with the nanocomposite, for example in a twin screw extruder or Buss kneader. However the particulate material may also be added to the process for forming the polyester nanocomposite, i.e., at or near the beginning of the polymerization process. It may be added at the same time as the fibrous clay, although if a lot of particulate material is added it may increase the viscosity of the material undergoing the polymerization process, and care should be taken not to increase the viscosity too high.

The solid particulate material exclusive of the fibrous clay may be present at 0 to about 60 weight percent of the total composition. Preferably, the solid particulate material is about 5 to about 50 weight percent of the total composition.

The polyester nanocomposite composition is preferably at least about 40 weight percent of the total composition, more preferably at least about 50 weight percent of the total composition.

Plasticizers

A plasticizer is a compound that, when added to a polymer, makes it more pliable, typically by lowering its glass transition temperature. A plasticizer is typically a compound or mixture of compounds with a melting point of about 50° C. or less with a(n) (average) molecular weight of 2000 or less. The plasticizer may be oligomeric, in which case its number average molecular weight (measured by Size Exclusion Chromatography using appropriate standards) is 2000 or less. These are typical properties of a plasticizer. For a further description of plasticizers see C. E. Carraher, Jr., Seymour/Carraher's Polymer Chemistry, $5^{th}$ Ed., Marcel Dekker Inc., New York, 2000, p. 60 and p. 463-465, which is hereby incorporated by reference.

Preferably the plasticizer is 0 to about 5 weight percent of the weight of polyester in the composition. One preferred type of plasticizer is a diester of a diol of the formula $R^{101}CO_2R^{102}O_2CR^{101}$ wherein each $R^{101}$ is independently hydrocarbyl containing 1 to 20 carbon atoms, more preferably alkyl, and each $R^{102}$ (by this is meant $R^{102}$ in each molecule may vary somewhat) is alkylene optionally substituted with ether groups, containing 2 to 30 carbon atoms. By alkylene is meant is a divalent hydrocarbyl radical (containing only carbon and hydrogen) in which the free valencies are on two different alkyl (saturated) carbon atoms. Specific useful plasticizers include poly(ethylene glycol 400) di-2-ethylhexanoate and poly(ethylene glycol)dilaurate with a number average molecular weight of approximately 946. Other useful plasticizers will be found in U.S. Pat. Nos. 5,432,334 and 4,548,978, which are hereby incorporated by reference. Not all plasticizers useful for one particular polyester will necessarily be useful for another polyester, but often this will be the case.

Additives

Other ingredients, particularly those commonly used in thermoplastics, may also be added to the present composition in amounts commonly used in thermoplastics. Such materials include antioxidants, lubricant, mold release, flame retardants, (paint) adhesion promoters, other types of polymers (to form polymer blends), etc. Preferably the total of all these ingredients is less than about 60 weight percent, more preferably less than about 40, and especially preferably less than about 25 weight percent of the composition.

Toughening Agents

Materials used to toughen polymers are well known. Two examples of the many references in this area are Polymer Blends—Volume 2: Performance, D. R. Paul and C. B. Bucknall, eds., John Wiley & Sons (2000) and Rubber-toughened Plastics (Advances in Chemistry Series No. 222), C. K. Riew (ed.), American Chemical Society (1989).

A preferred optional ingredient in the compositions of the present invention is a polymeric toughening agent. This is a polymer, typically which is an elastomer or has a relatively low melting point, generally <200° C., preferably <150° C., which has attached to it functional groups which can react with the polyester (and optionally other polymers present). Since polyesters usually have carboxyl and hydroxyl groups present, these functional groups usually can react with carboxyl and/or hydroxyl groups. Examples of such functional groups include epoxy, carboxylic anhydride, hydroxyl (alcohol), carboxyl, and isocyanato. Preferred functional groups are epoxy, and carboxylic anhydride, and epoxy is especially preferred. Such functional groups are usually "attached" to the polymeric toughening agent by grafting small molecules onto an already existing polymer or by copolymerizing a monomer containing the desired functional group when the polymeric tougher molecules are made by copolymerization. As an example of grafting, maleic anhydride may be grafted onto a hydrocarbon rubber using free radical grafting techniques. The resulting grafted polymer has carboxylic anhydride and/or carboxyl groups attached to it. An example of a polymeric toughening agent wherein the functional groups are copolymerized into the polymer is a copolymer of ethylene and a (meth)acrylate monomer containing the appropriate functional group. Useful (meth)acrylate functional compounds include (meth)acrylic acid, 2-hydroxyethyl(meth)acrylate, glycidyl(meth)acrylate, and 2-isocyanatoethyl (meth)acrylate. In addition to ethylene and a functional (meth)acrylate monomer, other monomers may be copolymerized into such a polymer, such as vinyl acetate, unfunctionalized (meth)acrylate esters such as ethyl(meth)acrylate, n-butyl(meth)acrylate, and cyclohexyl(meth)acrylate. Preferably the amount of polymeric toughening agent containing functional groups present is about 1 to about 20. percent by weight of the polyester. Preferred tougheners include those listed in U.S. Pat. No. 4,753,980, which is hereby incorporated by reference. Especially preferred tougheners are copolymers of ethylene, ethyl acrylate or n-butyl acrylate, and glycidyl methacrylate.

It is preferred that the polymeric toughener contain about 0.5 to about 20 weight percent of monomers containing functional groups, preferably about 1.0 to about 15 weight percent, more preferably about 7 to about 13 weight percent of monomers containing functional groups.

There may be more than one type of functional monomer present in the polymeric toughener. It has been found that toughness of the composition is increased by increasing the amount of polymeric toughener and/or the amount of functional groups. However, these amounts should preferably not be increased to the point that the composition may crosslink, especially before the final part shape is attained. Preferably there is about 2 to about 30 weight percent of the polymeric toughener in the composition, more preferably 5 to about 25 weight percent, and especially preferably about 10 to about 20 weight percent, of the total composition.

Epoxy Compounds or Resins

Another preferred type of other ingredient is an epoxy compound or resin. Preferably such a compound or resin has an average molecular weight of less than about 1000 (the polymeric toughening agent as described above, even if it does contain epoxy groups, is not considered herein part of this epoxy compound or resin). This epoxy material is preferably present at a level of 0.1 to about 1.0 weight percent of the entire composition.

Useful epoxy compounds or resins include Epon® 1002F, 1009F or 1031 (Resolution Performance Products, Houston, Tex.), or Araldite® GT7099 or GT6099 (Huntsman Advanced Materials Americas Inc., Los Angeles, Calif.). It is believed that in some instance the epoxy compound or resin stabilizes melt viscosity and/or improves color stability of the composition. The latter is particularly important when an appearance part is not coated with a paint or other coating.

It is to be understood that any preferred ingredient and/or ingredient amount may be combined with any other preferred ingredient and/or ingredient amount herein.

Melt Mixing

The compositions described herein can be made by typical melt mixing techniques. For instance the ingredients may be added to a single or twin screw extruder or a kneader and mixed in the normal manner. After the materials are mixed they may be formed (cut) into pellets or other particles suitable for feeding to a melt forming machine. Melt forming can be carried out by the usual methods for thermoplastics, such as injection molding, thermoforming, or extrusion, or any combination of these methods. Some of the ingredients such as fillers, plasticizers, and lubricants (mold release) may be added at one or more downstream points in the extruder, so as to decrease attrition of solids such as fillers, and/or improve dispersion, and/or decrease the thermal history of relatively thermally unstable ingredients, and/or decrease losses by evaporation of volatile ingredients.

It is also noted that "melt mixing" or more precisely applying shear stress to a melt of polyester nanocomposite (composition) sometimes results in better dispersion of the nanoparticles in the already formed nanocomposite (composition). Thus post treatment of the initially formed nanocomposite (composition) by shearing of the melt is a preferred process. This can be a process simply dedicated to improving the dispersion, or more preferably occur when the polyester composite is liquefied and subject to shear for another reason, such as mixing in other materials and or melt forming the nanocomposite composition. Useful types of apparatuses for this purpose include single and twin screw extruders and kneaders.

As mentioned above, parts of the present composition may be made by heating the composition above the melting point (or glass transition temperature if the polyester is amorphous) of the polyester (and hence liquefying the polyester), and then cooling them below the melting point to solidify the composition and formed a shaped part. Preferably the part is cooled at least 50° C. below the melting point, more preferably at least 100° C. below the melting point. Most commonly, ultimately the composition will be cooled to ambient temperature, most typically 15-45° C.

Appearance Parts

The compositions described herein (often when having additional optional ingredients present) are particularly useful as "appearance parts", that is parts in which the surface appearance is important. This is applicable whether the composition's surface is viewed directly, or whether it is coated with paint or another material such as a metal. Such parts include automotive body panels such as fenders, fascia, hoods, tank flaps and other exterior parts; interior automotive panels; appliance parts such as handles, control panels, chassises (cases), washing machine tubs and exterior parts, interior or exterior refrigerator panels, and dishwasher front or interior panels; power tool housings such as drills and saws; electronic cabinets and housings such as personal computer housings, printer housings, peripheral housings, server housings; exterior and interior panels for vehicles such as trains, tractors, lawn mower decks, trucks, snowmobiles, aircraft, and ships; decorative interior panels for buildings; furniture such as office and/or home chairs and tables; and telephones and other telephone equipment. As mentioned above these parts may be painted (coated) or they may be left unpainted in the color of the composition. Any coating process may be used which is designed to coat polyester parts. The coating may be applied by dipping, spraying, electrostatic spraying, etc.

The composition may be colored with pigments and/or dyes, so many color variations are possible. This type of coloration of parts made from the composition is particularly attractive economically, since such parts need not be subsequently coated (painted) in one or more additional steps. If extremely high gloss and/or distinctness of image are not needed, this is often a better overall alternative to coating. Alternatively of course parts made from this composition may also be coated (painted).

Another method of coloring the surface of parts made from these compositions (or variation thereof) is a dye sublimation (printing) process.

Process for Coating Automotive Bodies

As mentioned above the present compositions or variations thereof may be used for automobile parts, especially automobile (car) bodies. Automotive bodies, generally require a somewhat more complex coating process than simply "painting on" a coating. Currently, there are three different approaches to the production of coated car bodies assembled from metal and plastic parts in a mixed construction:

1. The method known as the off-line process, in which the metal car body and the plastic parts are coated separately and then assembled.

The drawback of the off-line process is its susceptibility to lack of visual harmonization of the coated metal and plastic surfaces, at least in cases where coated plastic parts and coated metal parts are subjected to direct visual comparison for reasons of construction, for example, owing to the virtually seamless proximity of the coated parts and/or arrangement of the coated parts in one plane.

A further drawback is the necessity of operating two coating lines.

2. The method known as the in-line process in which the metal body already provided with an electrodeposition coating as a primer and the uncoated plastic parts or the plastic parts optionally only provided with a plastic primer are assembled and provided with one or more further coating layers in a subsequent common coating process.

The drawback of the in-line process is the assembly step inserted into the coating process as an interruptive intermediate step which also involves the risk of introducing dirt into the further coating process.

3. The method known as the on-line process, in which the uncoated body parts made of metal and the uncoated plastic parts or the plastic parts optionally only provided with a plastic primer are assembled into a body constructed in a mixed construction and then passed through a common coating process including electrodeposition coating, wherein naturally only the electrically conductive metal parts are provided with an electrodeposition coating, while all the coating layers to be applied subsequently are applied both to the electrodeposition coated metal parts and to the plastic parts.

The on-line process is particularly preferred as it clearly separates the body base shell construction and the coating process and allows an undisturbed coating sequence.

Basically, only adequately heat-resistant and simultaneously heat deformation-resistant plastics materials are suitable for the particularly preferred on-line process, since high temperatures are used in drying the electrodeposition coating.

Coating substrates car bodies assembled from metal parts and at least one plastic part (the composition described herein), with visible metal and plastic surfaces, comprising the successive steps:

(1) electrodeposition coating the substrates, removing non-deposited electrodeposition coating agent from the substrate and thermally cross-linking the deposited electrodeposition coating and thereby forming an electrodeposition coating primer on the metal surfaces, (2) application and curing of at least one additional coating at least on all the visible metal and plastic surfaces, at least one of the plastic parts making up the visible plastic surfaces of the substrate having the composition described herein.

When they will be coated the plastic parts (of the composition described herein) may be pretreated in a conventional manner, for example, by UV irradiation, flame treatment or plasma treatment or be coated with a conventional plastic primer known to the person skilled in the art, in particular a conductive primer providing the plastic part with adequate electrical conductivity for electrostatically-assisted coatability, before they are assembled with the metal parts.

The metal parts and the at least one plastic part optionally provided with a plastic primer are assembled in the conventional manner known to the person skilled in the art, for example by screwing, clipping and/or adhesion, to form the substrate to be coated by the process according to the invention.

At least that (those) plastic part(s) of a substrate with the smallest possible joint width and in particular also in the same plane as the adjacent metal parts is (are) assembled with the metal parts.

Optionally, further plastic parts that are still missing from the body, if any, which in general will differ in composition from the at least one plastic part and which in general are less resistant to heat deformation can be fitted on after completion of step (1) of the process according to the invention and can also be subjected to the further coating process of step (2) (compare the in-line process described above) and/or be fitted on after completion of the process according to the invention in finished coated form (compare the off-line process described above).

In view of the application of at least one further coating layer, taking place in step (2) of the process according to the invention, preferably by electrostatically-assisted spray coating, it is expedient if the metal and plastic part(s) are assembled such that that they are not electrically insulated from one another; for example, a direct electric contact between the conductive primer and metal can be ensured by direct contact or via electrically conductive connecting elements, for example, metal screws.

To produce an anti-corrosive primer layer on the metal parts, the substrates assembled from metal parts and at least one plastic part in step (1) of the process according to the invention are coated in an electrodeposition coating bath in the conventional manner known to the person skilled in the art.

Suitable electrodeposition coating agents include conventional waterborne coating compositions with a solids content from, for example, 10 to 30 wt. percent.

The electrodeposition coating compositions may be conventional anodic electrodeposition coating agents known to the skilled person. The binder basis of the anodic electrodeposition coating compositions may be chosen at will. Examples of anodic electrodeposition binders are polyesters, epoxy resin esters, (meth)acrylic copolymer resins, Melanie oils or polybutadiene oils with a weight average molecular mass (Mw) of, for example, 300-10,000 and a carboxyl group content, for example, corresponding to an acid value of 35 to 300 mg OH/g. At least a part of the carboxyl groups is converted to carboxylate groups by neutralization with bases. These binders may be self cross-linking or cross-linked with separate cross-linking agents.

Preferably conventional cathodic electrodeposition coating agents known to the skilled person are used in the process according to the invention for the application of the electrodeposition coating layer.

Cathodic electrodeposition coating compositions contain binders with cationic groups or groups which can be converted to cationic groups, for example, basic groups. Examples include amino, ammonium, e.g., quaternary ammonium, phosphonium and/or sulfonium groups. Nitrogen-containing basic groups are preferred; said groups may be present in the quaternized form or they are converted to cationic groups with a conventional neutralizing agent, e.g., an organic monocarboxylic acid such as, e.g., formic acid, lactic acid, methane sulfonic acid or acetic acid. Examples of basic resins are those with primary, secondary and/or tertiary amino groups corresponding to an amine value from, for example, 20 to 200 mg KOH/g. The weight average molecular mass (Mw) of the binders is preferably 300 to 10,000. Examples of such binders are amino(meth)acrylic resins, aminoepoxy resins, aminoepoxy resins with terminal double bonds, aminoepoxy resins with primary OH groups, aminopolyurethane resins, amino group-containing polybutadiene resins or modified epoxy resin-carbon dioxide-amine reaction products. These binders may be self-cross-linking or they may be used with known cross-linking agents in the mixture. Examples of such cross-linking agents include aminoplastic resins, blocked polyisocyanates, cross-linking agents with terminal double bonds, polyepoxy compounds or cross-linking agents containing groups capable of transesterification.

Apart from binders and any separate cross-linking agents, the electrodeposition coating compositions may contain pigments, fillers and/or conventional coating additives. Examples of suitable pigments include conventional inorganic and/or organic colored pigments and/or fillers, such as carbon black, titanium dioxide, iron oxide pigments, phthalocyanine pigments, quinacridone pigments, kaolin, talc or silicon dioxide. Examples of additives include, in particular, wetting agents, neutralizing agents, leveling agents, catalysts, corrosion inhibitors, anti-cratering agents, anti-foaming agents, solvents.

Electrodeposition coating takes place in a conventional manner known to the skilled person, for example, at deposition voltages from 200 to 500 V. After deposition of the electrodeposition coating, the substrate is cleaned from excess and adhering but non-deposited electrodeposition coating in a conventional manner known to the skilled person, for example, by rinsing with water. Thereafter the substrate is baked at oven temperatures of, for example, up to 220° C. according to object temperatures of, for example, up to 200° C. in order to crosslink the electrodeposition coating.

When using the electrodeposition process or electrostatic spray coating for step 2 it is preferred that the plastic part to be coated be somewhat electrically conductive so that it may be charged. When it is charged it attract the oppositely charged small particles or droplets of the coating being sprayed or into which it is being dipped, thereby facilitating coating of the part. Plastics may be made electrically conducting by incorporating into them electrically conducting fillers such as carbon black, carbon fibers or metallic fibers.

In the subsequent step (2) of the process according to the invention, at least one further coating layer is applied, preferably by spray application, in particular, electrostatically-assisted spray application, at least to all the visible metal and plastic surfaces on the substrates thus obtained and only provided with a baked electrodeposition coating layer on the metal surfaces.

If only one further coating layer is applied, this is generally a pigmented top coat. However, it is preferred to apply more than one further coating layer. Examples of conventional multicoat constructions formed from a plurality of coating layers are:

primer surfacer/top coat.
primer surfacer/base coat/clear coat,
base coat/clear coat,
primer surfacer substitute layer/base coat/clear coat.

Primer surfacers or primer surfacer substitute coatings are mainly used for stone-chip protection and surface leveling and prepare the surface for the subsequent decorative top coat which provides protection against environmental influences and is made of pigmented top coat or of color- and/or effect-producing base coat and protective clear coat.

The multicoat constructions mentioned by way of example may also be provided over the entire surface or part of the surface with a transparent sealing coat, in particular, providing high scratch-resistance.

All these coating layers following the electrodeposition coating layer may be applied from conventional coating agents well known to the person skilled in the art for applying the relevant coating layer. This can be a respective liquid coating agent containing, for example, water and/or organic solvents as diluents or a powder coating agent. The coating agents may be a single-component or multi-component coating agent; they may be physically drying or by oxidation or be chemically crosslinkable. In particular, primer surfacers, top coats, clear coats and sealing coats these are generally chemically cross-linking systems which can be cured thermally (by convection and/or by infrared irradiation) and/or by the action of energy-rich radiation, in particular ultraviolet radiation.

If more than one coating layer is applied in step (2) of the process according to the invention, the coating layers do not basically have to be cured separately prior to application of the respective subsequent coating layer. Rather, the coating layer can be applied according to the wet-on-wet principle known to the person skilled in the art, wherein at least two coating layers are cured together. In particular, for example, in the case of base coat and clear coat, following the application of the base coat, optionally followed by a short flash-off phase, the clear coat is applied and cured together with the base coat.

The on-line process according to the invention allows substrates assembled in a mixed construction from metal parts and plastic parts which are based on thermoplastics and are adequately resistant to heat deformation to be coated with excellent harmonization of the visual impression of the coated plastic and metal surfaces.

Nonappearance Parts

Nonappearance parts may also be made with these compositions. These are parts whose surface appearance is not critical. Such parts include those now made with so-called engineering thermoplastics, especially those which are filled with materials which are designed to enhance the composition's physical properties, such as stiffness, toughness, and tensile strength. The nanocomposite compositions are believed to enhance these properties in many instances without deleteriously affecting other properties such as melt viscosity, especially when the concentration of the clay in the nanocomposite composition is relatively low.

EXAMPLES

The meaning of abbreviations is as follows: "min" means minute(s), "mL" means milliliter(s), "g" means gram(s), "mg" means milligram(s), "mmol" means millimole(s), "mtorr" means millitorr, "wt %" means weight percent(age), "ppm" means parts per million, $T_g$ means glass transition temperature, "$T_m$" means melting point, "IV" means intrinsic viscosity, "$M_n$" means number average molecular weight, "PDI" means polydispersity index and equals the weight average molecular weight divided by $M_n$, "NMR" means nuclear magnetic resonance, "DSC" means differential scanning calorimetry, "TEM" means transmission electron microscopy, Materials Bis(2-hydroxyethyl)terephthalate (BHET), antimony oxide (99%), and manganese acetate (99%) were purchased from Aldrich Chemical Company (Milwaukee, Wis., USA). Sodium Cloisite® 25A, a sodium montmorillonite modified with a quaternary ammonium salt, was purchased from Southern Clay Products, Inc. (Gonzales, Tex., USA). Super-Pflex® 200 PCC (precipitated calcium carbonate, average diameter 0.7 micron, 2% stearic acid surface coating) and Ultra-Pflex® PCC (average diameter, 0.07 micron) were obtained from Specialty Minerals Inc. (Bethlehem, Pa., USA).

Pangel® S9 sepiolite, which is a rheological grade of sepiolite and is not organically modified, was purchased from EM Sullivan Associates, Inc. (Paoli, Pa., USA), a distributor for the manufacturer, Tolsa S. A. (Madrid 28001, Spain Polymer Characterization.

A size exclusion chromatography system comprised of a Model Alliance® 2690 from Waters Corporation (Milford, Mass. USA), with a Waters® 410 refractive index detector (DRI) and Viscotek Corp. (Houston, Tex., USA) Model T-60A™ dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate. The dn/dc was measured for the polymers and it was assumed that all of the sample was completely eluted during the measurement.

The diethylene glycol (DEG) content (wt %) was determined using $^1$H NMR.

Melting Point and Glass Transition Temperature. The glass transition temperature, and melting point were determined by differential scanning calorimetry using ASTM Method D3418-82, using a heating rate of 10° C./min, the melting point being measured on the first heat. The melting point was taken as the peak of the melting endotherm, and the glass transition temperature was taken as the midpoint of the transition.

Crystallization Half-Time ($t_{1/2}$).

In one sample preparation method the sample was simply used as was. In another method the sample was heated to 290° C., and quenched in liquid nitrogen. With either preparation method the sample was then heated at a rate of 200° C./min to the desired temperature and the crystallization exotherm followed at that temperature in the DSC. From the exotherm curve generated with time, the crystallization half life at that temperature was then calculated.

Instrument Impact Test

This test measures the force vs. time as a weighted 1.27 cm (½") diameter hemispherical tipped tup weighing 7.3 kg (16 pound) is dropped from 1.09 m through a 0.32 cm (⅛") thick molded plaque. This gives a nominal tup speed of 4.5 m/sec when striking the plaque. The plaque is clamped on the top and bottom surfaces, both sides of the clamp having colinear 3.81 cm (1.5") diameter holes, and the tup strikes the plaque in the center of these holes. An accelerometer is attached to the tup and the force during the impact is recorded digitally. The maximum force and total energy to break are calculated from the data. The data reported are the average of three determinations.

Tensile Modulus, Strength and Elongation

Measured using ASTM Method D256 at an extension rate of 5.08 cm (2") per minute.

Flexural Modulus (Three Point)

Measured using ASTM Method D790.

In the Examples all parts are parts by weight.

Melt Viscosity

Determined using a Kayness Model 8052 viscometer, Kayness Corp., Morgantown Pa., U.S.A., at 280° C. and a shear rate of 1000/sec, with an orifice which was 1.52 cm (0.600") long and 0.0762 cm (0.030") in diameter. Holdup time was simply the amount of time which elapsed after the sample was added to the viscometer and before the measurement began, and was 6 minutes.

Example 1

BHET (300 g, 1.17 mol), sepiolite (Pangel® S9, 9 g), antimony oxide (96.5 mg, 321 ppm), and manganese acetate (102 mg, 340 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. $M_n$=26000, PDI=1.81, % DEG=13 wt %, IV=0.9, $T_g$=65° C., $T_m$=228° C. The material so produced was characterized using TEM, which showed the sepiolite clay to be exfoliated and dispersed as fibers in the polymer (FIG. 1).

Comparative Example A

BHET (300 g, 1.17 mol), Sodium Cloisite (9 g), antimony oxide (96.5 mg, 321 ppm), and manganese acetate (102 mg, 340 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. $M_n$=55300, % DEG=13 wt %, IV=0.8, $T_g$=69° C., $T_m$=223° C. The material so produced was characterized using TEM, which showed the Sodium Cloisite® 25A filler to be present as agglomerates (FIG. 2).

Comparative Example B

BHET (250 g, 0.975 mol), Ultra-Pflex® (6.25 g), antimony oxide (85 mg, 340 ppm), and manganese acetate (85 mg, 340 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. $M_n$=33200, % DEG=5 wt %, IV=0.9, $T_g$=83° C., $T_m$=243° C.

Figure 3:
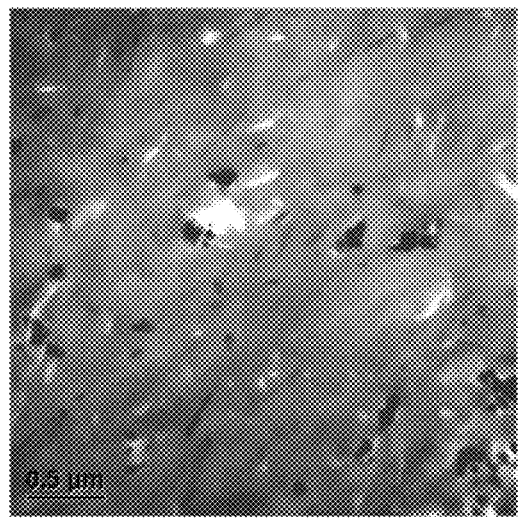
FIG. 3 is a transmission electron micrograph of PET containing 2.5 wt % Ultra-Pflex® PCC.

The material so produced was characterized using TEM, which showed the filler to be present as agglomerates with a small proportion of plate-like structures (FIG. 3).

Comparative Example C

Figure 4:
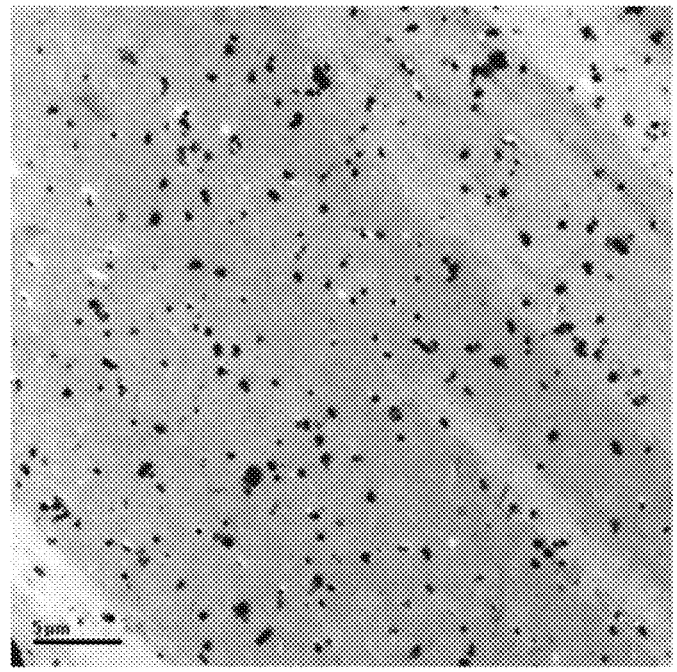
FIG. 4 is a transmission electron micrograph of PET containing 3 wt % Super-Pflex® 200 PCC.

BHET (250 g, 0.975 mol), Super-Pflex® 200 (6.75 g), antimony oxide (80.4 mg, 321 ppm), and manganese acetate (85 mg, 340 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. $M_n$=33200, % DEG=5 wt %, IV=0.9, $T_g$=83° C., $T_m$=243° C. The material so produced was characterized using TEM, which showed the filler to be present as agglomerates typically about 1 micron in diameter (FIG. 4).

Example 2

BHET (300 g, 1.17 mol), sepiolite clay (Pangel® S9, 6 g), antimony oxide (80 mg, 343 ppm), and sodium acetate (80 mg, 343 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. The reaction was cooled under a nitrogen purge.

$T_m$ and $T_g$ were determined as described above, and $t_{1/2}$ was determined at 110, 120, and 130° C. Results are presented in Table 1.

Comparative Example D

An organically modified montmorillonite (OMMT) was prepared as described in J.-H. Chang et al, Polymer, 45(3), 919-926 (2004). The freshly prepared OMMT was used in the following polymerization. BHET (300 g, 1.17 mol), OMMT (OMMT, 6.9 g), antimony oxide (79 mg, 300 ppm), and manganese acetate (22 mg, 100 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. The reaction was cooled under a nitrogen purge.

$T_m$, and $T_g$ were determined as described above, and $t_{1/2}$ was determined at 110, 120, and 130° C. Results are presented in Table 1.

Comparative Example E

BHET (300 g, 1.17 mol), antimony oxide (79 mg, 300 ppm), and manganese acetate (22 mg, 100 ppm) were charged to a 500 mL three necked round-bottomed flask. An overhead stirrer was attached and a distillation condenser was attached. The reaction was heated to 180° C. under a light nitrogen flush. The reaction was held at 180° C. for 90 min. The reaction temperature was increased to 225° C. The reaction temperature was held at 225° C. for 30 min. The reaction temperature was increased to 295° C. at a rate of 1° C./min. When the temperature reached 295° C., the reaction temperature was held constant for 30 min. The nitrogen flush was closed off and vacuum was slowly introduced. After 15 min, the vacuum was increased to a full vacuum eventually reaching a vacuum of 5 Pa. The reaction was maintained under vacuum for approximately 120 min. The reaction was cooled under a nitrogen purge.

$T_m$ and $T_g$ were determined as described above, and $t_{1/2}$ was determined at 110, 120, and 130° C. Results are presented in Table 1 and demonstrate the superior efficacy of the organically unmodified sepiolite clay S9 in promoting PET crystallization.

TABLE 1

| Ex | Clay | $T_g$ (° C.) | $T_m$ (° C.) | $t_{1/2}$ @130° C. | $t_{1/2}$ @120° C. | $t_{1/2}$ @110° C. |
|---|---|---|---|---|---|---|
| 2 | S9 | 81 | 256 | 0.52 | 1.28 | 2.42 |
| D | OMMT | 79 | 252 | 1.05 | 3.83 | ND |
| E | None | 78 | 256 | 1.80 | 4.6 | 8.0 |

* the times indicated were determined by interpolation of the crystallization half-times at 135° C. and 125° C.

Example 3

Polyethylene terephthalate was produced in a four vessel continuous polymerization process system, consisting of a monomer reactor and three polymerization reactors in series. The monomer reactor (Ester Exchanger) was a cylindrical vertical vessel operated at 220° C. to 230° C. and atmospheric pressure which chemically reacts molten dimethyl terephthalate (DMT) and polymer grade ethylene glycol (EG) to create the polyester monomer. The Ester Exchanger consists of a cylindrical trayed distillation column 7.0 m high and 2.1 m in diameter sitting over an cylindrical base section which collects monomer from the trayed section of the reactor. DMT and EG were fed into the trayed section of the reactor. As the reaction progressed on the trays, the monomer that was formed moves down the reactor and the byproduct, methanol, moved up the column. The reaction was catalyzed by the addition of manganese [II] acetate tetrahydrate in solution in the EG. The final three vessels' purpose was to remove EG from the reaction mass to drive the polycondensation reaction and increase polymer molecular weight. This polymerization reaction was catalyzed by the addition of antimony oxide ($Sb_2O_3$) in solution in the EG added into the completed monomer stream. The first vessel in this polymerization series (Flasher) was an unstirred, 1.73 $m^3$ vessel run at 255° C. and 8.5 kPa absolute pressure. The second vessel was a 4.56 $m^3$ agitated vessel (Prepolymerizer) run at 288° C. and 1.2 kPa absolute pressure. The third vessel (Finisher) was a horizontal, cylindrical, 8.38 $m^3$, reactor operated at 292° C. and 350 Pa absolute pressure. The polymer in its final state was pumped from the 'finisher', extruded into strands, cooled until it solidified and then cut into pellets of a size where 95 to 100 pellets weighed 2.5 g.

Polymer molecular weight was primarily controlled by adjusting the pressure of the polymerization reactors. Polymer melt viscosity was measured at the exit of the finisher. This measurement is correlated to polymer molecular weight and used as a real time control point for adjusting finisher vacuum. Higher pressures increase the rate of molecular weight build. Lower pressures decrease that rate.

In this example, 907 kg/h of DMT and 454 kg/h of EG were fed into the trayed section of the Ester Exchanger. Additionally the EG stream contained 0.018 weight % solution of manganese acetate tetrahydrate. The monomer, bis(2-hydroxyethyl)terephthalate (BHET), was separated and taken off in the column bottoms. At any one time approximately 2180 kg of polyester intermediates or polyester were contained in the bottom section of the ester exchanger, 1630 kg were contained in the flasher, 1620 kg were contained in the prepolymerizer, and 1610 kg were contained in the finisher.

In a separate step 227 kg of Pangel® S9 sepiolite were added to 2270 kg of EG in a 3790 L tank and blended to a consistent slurry using an 20.3 cm diameter propeller style agitator. The resulting 9 weight % solids slurry was pumped to a holding tank using a centrifugal pump. Slurry from the holding tank was fed at a controlled rate to the continuous polymerization process at 303 kg/h using a gear pump into the bottom, open section of the Ester Exchanger. This resulted in a final product which was 3.0 weight % sepiolite in polyester.

In a separate step a 2.5 weight % solution of potassium acetate in ethylene glycol was added to the monomer in the transfer line between the Ester Exchanger and the Flasher. Other additives such as the polymerization catalyst, antimony oxide, were also injected into the monomer at this same location.

Examples 4-5 and Comparative Examples F-I

Samples were prepared from the composition made in Example 3, and from similar poly(ethylene terephthalate) whose polymerization did not include sepiolite. The compositions were made by melt mixing on a 30 mm Werner & Pfleiderer twin screw extruder having 13 barrel sections. All of the ingredients were rear fed, except for the Loxiol® HOB7119 which was fed to barrel 1, and the Plasthall® 809 which was injected near the front of the extruder. The screw configuration used was fairly severe so good mixing (high shear) was obtained. Extrusion conditions were 360 rpm, extrusion rate of 27 kg/h, barrel 2 was set to 180° C., barrel 3 was set to 250° C. and barrels 4-13 were set to 290° C., and then materials were pelletized after exiting the extruder and cooling. Compositions and properties are given in Table 2. Test pieces were injection molded and various tests performed. These results are also shown in Table 2.

TABLE 2

| | Example | | | | | |
|---|---|---|---|---|---|---|
| | 4 | F | G | 5 | H | I |
| Composition of Example 3 | 96.2 | 0 | 0 | 86.2 | 0 | 0 |
| Polyester A[a] | | 93.9 | 93.9 | | 83.9 | 83.9 |
| Pangel ® S9, dried at 150° C. | | 2.3 | | | 2.3 | |
| Pangel ® S9, dried at 350° C. | | | 2.3 | | | 2.3 |
| Polymer A[b] | | | | 10 | 10 | 10 |
| Irganox ® 1010[c] | 0.1 | 0.1 | 0.1 | 0.1 | 0.1 | 0.1 |
| Ultranox ® 626[d] | 0.2 | 0.2 | 0.2 | 0.2 | 0.2 | 0.2 |
| Loxiol ® HOB7119[e] | 0.5 | 0.5 | 0.5 | 0.5 | 0.5 | 0.5 |
| Plasthall ® 809[f] | 3 | 3 | 3 | 3 | 3 | 3 |
| Tensile Bar Sag @ 200° C., mm | | | | | | |
| Flex modulus, Gpa | 3.57 | 3.24 | 3.25 | 2.68 | 2.27 | 2.31 |
| Tensile Strength, Mpa | 73.0 | 57.6 | 61.5 | 54.4 | 47.0 | 46.4 |
| Elongation, % | 7.5 | 5.5 | 12.0 | 36.4 | 14.7 | 14.3 |
| Instrumented Impact, J | 2.28 | 1.12 | 1.59 | 71.21 | 4.34 | 5.90 |
| Instrumented Impact, J, STD DEV | 0.54 | 0.45 | 0.56 | 4.59 | 0.88 | 1.10 |
| Peak Force, kg | 61 | 38 | 42 | 492 | 134 | 141 |
| Melt Viscosity, Pa sec, 280° C. | 57 | 33 | 58 | 207 | 161 | 199 |

[a]Made by similar process as in Example 3, but with no sepiolite present.
[b]Ethylene/n-butyl acrylate/glycidyl methacrylate (66/22/12 wt. %) copolymer, melt index 8 g/10 min
[c]Antioxidant available from Ciba Specialty Chemicals, Tarrytown, NY 10591, USA.
[d]An antioxidant, bis(2,4-di-t-butylphenyl)penterythritol diphosphite, available from GE Specialty Chemicals, Inc., Morgantown, WV 26501 USA.
[e]Lubricant, from Cognis Corp. USA, Cincinnati, OH 45232 USA.
[f]Polyethylene glycol 400 di-2-ethylhexanoate.

The melt viscosities show that the compositions contained polyesters of similar molecular weights, although Comparative Examples F and H may have suffered some hydrolysis in the melt blending. The properties of the compositions of Examples 4 and 5 showed good stiffness (flexural modulus) and tensile strength while still having superior toughness. The combination of high stiffness and toughness is often difficult to achieve, whether the composition is toughened (Polymer A) or not.

We claim:

1. A process for manufacturing a thermoplastic polyester nanocomposite composition via a condensation polymerization, the process comprising the steps of:
   (i) mixing exfoliated fibrous clay with at least one thermoplastic polyester precursor composition wherein the components of the precursor composition are selected from the group consisting of
      a) at least one diacid or diester and at least one diol;
      b) at least one polymerizable polyester monomer;
      c) at least one linear polyester oligomer; and
      d) at least one macrocyclic polyester oligomer,
   and, optionally, a polymerization catalyst in addition to the exfoliated fibrous clay, and
   (ii) subsequently polymerizing said at least one polyester precursor in the absence of a solvent,
   wherein said exfoliated fibrous clay is a nano-sized clay that has not been organically modified prior to mixing.

2. The process as recited in claim 1 wherein the fibrous clay content in the composition so produced is 0.1 to 20 weight percent, based on the total weight of said clay and said polyester precursor composition.

3. The process as recited in claim 1 wherein said polyester consists essentially of repeat units derived from one or more of terephthalic acid, isophthalic acid and 2,6-naphthalene dicarboxylic acid, and repeat units derived from one or more of HO(CH$_2$)$_n$OH, 1,4-cyclohexanedimethanol, HO(CH$_2$CH$_2$O)$_m$CH$_2$CH$_2$OH, and HO(CH$_2$CH$_2$CH$_2$CH$_2$O)$_z$CH$_2$CH$_2$CH$_2$CH$_2$OH, wherein n is an integer of 2 to 10, m is an average of 1 to 4, and z is an average of about 7 to about 40.

4. The process as recited in claim 1 wherein said polyester is poly(ethylene terephthalate), poly(1,3-propylene terephthalate), poly(1,4-butylene terephthalate), or poly(1,4-cylohexyldimethylene terephthalate), or a modified version thereof.

5. The process as recited in claim 1 wherein the polymerization of the polyester precursor is carried out as a continuous process.

6. The process as recited in claim 1 wherein the polymerization of the polyester precursor is carried out as a batch or semibatch process.

7. The process as recited in claim 1 wherein no polyester polymerization catalyst is added in addition to the fibrous clay.

8. The process as recited in claim 1 wherein one or more solid particulate fillers are present during polymerization, with the proviso that said solid particulate fillers do not interfere with the polymerization.

9. The process as recited in claim 1 comprising the additional step of subjecting said composition in the liquid state to shear stress.

10. The process as recited in claim 1 wherein said fibrous clay is first mixed with at least a portion of said at least one diol to form a slurry and said slurry is thereafter mixed with said at least one diacid and the remainder of said at least one diol; and wherein said slurry formed by mixing the fibrous clay with at least a portion of said at least one diol has 9 to 12 weight percent solids in the form of said fibrous clay.

11. The process as recited in claim 10 wherein said slurry is added after 75 percent of a stoichiometric amount of water or alcohol produced from the condensation polymerization has been removed from the polymerization process.

* * * * *